April 11, 1961     H. N. WEBSTER     2,979,072
VALVES

Filed March 9, 1956     2 Sheets-Sheet 1

INVENTOR.
Henry N. Webster,
BY Paul & Paul
ATTORNEYS 2,979,072
Patented Apr. 11, 1961

2,979,072
VALVES

Henry N. Webster, Sebring, Fla., assignor to Webster Corporation, Sebring, Fla., a corporation of Florida Filed Mar. 9, 1956, Ser. No. 570,514

3 Claims. (Cl. 137—322)

This invention relates to valves for controlling fluid flow in conduiting or piping. More specifically, it is concerned with valves of a type having beveled seats and cooperative complementally beveled disk-line closure elements with O ring gaskets to seal against the bevel faces of the seats.

It has been found that due to sudden rush of fluid of the kind referred to as ordinarily constructed, chattering invariably occurs, and that incident to opening valves, the gaskets are frequently dislodged or sloughed from within the retaining grooves of the closure elements.

My invention has for its chief aim to overcome the above mentioned drawbacks. How this objective is realized in practice will appear from the following detailed description of the attached drawings, wherein.

Figure 1:
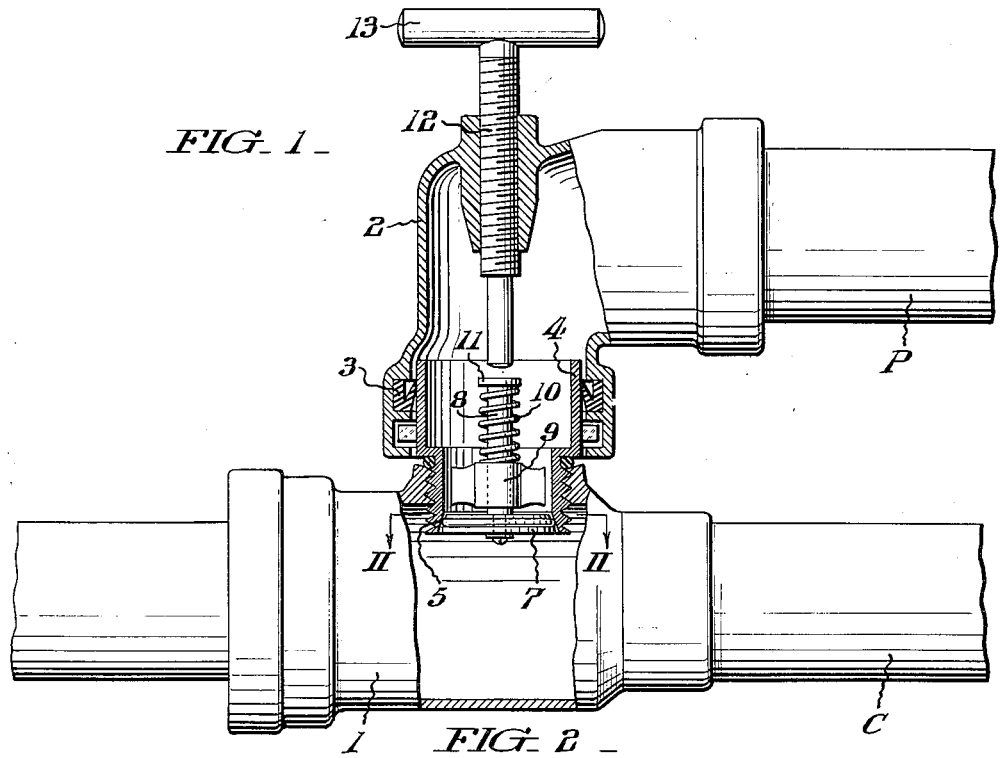
Fig. 1 is a view, partly in elevation and partly in section, of a conduit system with an interposed flow control valve conveniently embodying my invention.
Figure 2:
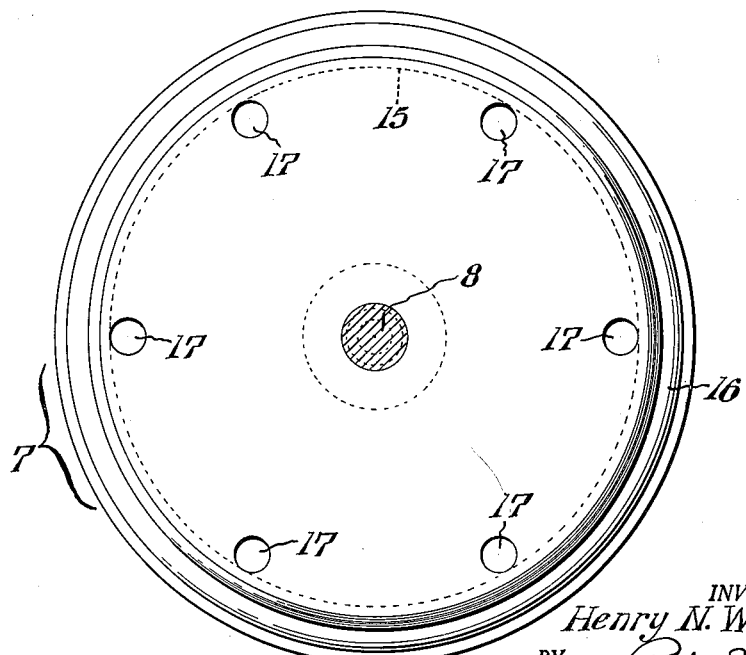
Fig. 2 is a horizontal sectional view on a larger scale taken as indicated by the angled arrows II—II in Fig. 1 and showing the closure element of the valve in top plan.

As herein illustrated, my improved valve has a body with a main component 1 interposed in a conduit C which, for example, may lead from a source of water under pressure for an irrigation system, and a swivel component 2 in the form of an elbow whereto a branch pipe P is connected. The component 2 of the valve body is engaged, with interposition of a packing annulus 3, over a tubular neck section 4 which is screwed into the component 1, and which, at the bottom end, provides a beveled seat 5. The closure element of the valve is in the form of a disk 7 affixed to an axial stem 8 which is guided for endwise sliding movement in the central boss of a spider 9 spanning the hollow of the body section 4. A helical spring 10, in compression between the boss of the spider 9 and a head 11 at the upper or distal end of the stem 8, serves to normally maintain the disk 7 in closed position. The valve is operable by means of a screw spindle 12 having a manipulating handle 13 at its outer end.

Figure 3:
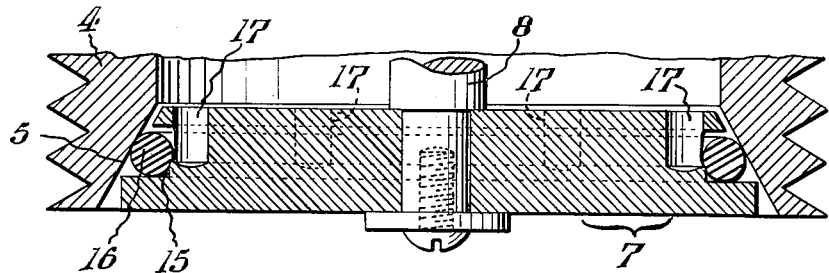
Fig. 3 is a large scale fragmentary view corresponding to Fig. 1 and showing the closure element in closed position.
Figure 4:
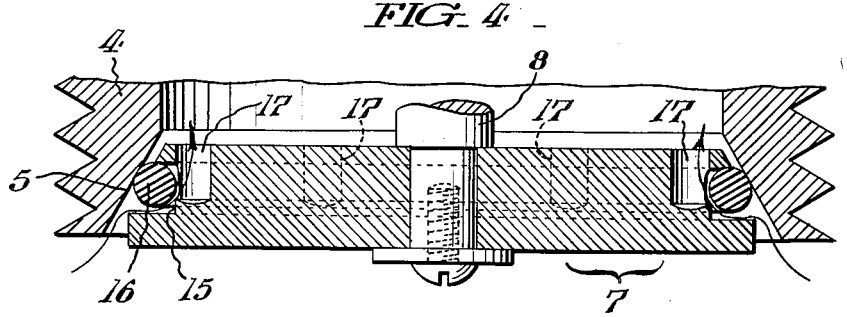
Figs. 4 and 5 are views similar to Fig. 3 showing successive positions of the closure element incident to opening the valve.
Figure 5:
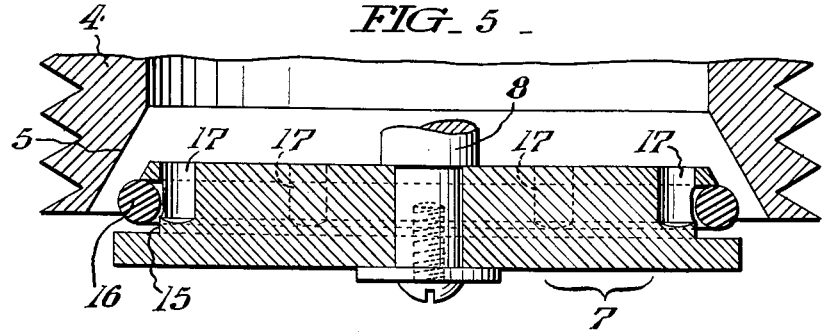

The periphery of the closure disk 7 is beveled to correspond with the bevel of the seat 5 and is provided with a peripheral groove 15 in which an O ring gasket 16 of rubber or the like is lodged, the groove being somewhat wider, in accordance with my invention, than the thickness of said gasket as best seen in Figs. 3–5. The closure disk 7 is provided, moreover, with a series of uniformly-spaced annularly arranged relief ports 17 which extend downward from the top or small area face of the disk and communicate laterally with the groove 15.

By upward pressure of the liquid within the conduit C upon the disk and upward pull of the spring 10 when the valve is closed as in Fig. 1, the ring gasket 16 is squeezed between the bevel of the seat 5 and the bottom of the groove 15 in said disk as best shown in Fig. 3. A perfect fluid tight seal is thus normally maintained between the seat 5 and the closure disk 7.

Operation

In the use of the valve, the screw spindle 12 is turned and, upon contact with the stem 8, causes the closure element 7 to be depressed against the resistance of the spring 10. At the initiation of valve opening, the closure element 7 moves relative to the gasket 16 which, for the moment, will remain in contact with the seat 5 as in Fig. 4 due to upward pressure thereupon of the fluid in the conduit C. As a consequence of this change in the position of the closure element 7 relative to the gasket 16, a small amount of the fluid is permitted to by-pass around said gasket from beneath in the groove 15 and to flow up through the ports 17 in said closure element, the effort necessary to open the valve being greatly minimized accordingly. If the valve is left for a time in the position of Fig. 4, a pilot action will take place which is of prime importance where a small flow of fluid is advantageous to fill the branch pipe P before the valve is fully opened through the position of Fig. 5 for maximum delivery of the fluid.

From the foregoing it will be seen that a valve, constructed in accordance with my invention and as defined in the appended claims, is free from chattering tendencies, with assurance against the possibility of the gasket being displaced or sloughed from within the retaining groove of the closure element.

While in accordance with the provisions of the statutes, I have illustrated and described the best forms of embodiment of my invention now known to me, it will be apparent to those skilled in the art that changes may be made in the form of the apparatus described without departing from the spirit and scope of the invention as set forth in the appended claims, and that in some cases certain features of my invention may be used to advantage without a corresponding use of other features.

Having thus described my invention, I claim:

1. In a coupling valve having a body in the form of an elbow with its inlet swivelly connected to a conduit extending from a source of fluid under pressure and its outlet connected to a delivery conduit, and a downwardly-flared seat within the conduit at the inlet end: a closure disk normally held in closed position by spring means, said disk having a bevelled peripheral flare complemental to the seat, a square section circumferential groove in the bevel face parallel to the general plane of the disk, at least one relief port extending up from the rear corner of the groove to the top surface of the disk, and an O ring gasket lodged, with capacity for limited up and down play, within the groove of the disk but of a diameter to project peripherally beyond the disk for maintenance normally alone in sealing engagement with the seat by the force of the spring means and the action of the fluid pressure upon the disk from beneath whereby, upon slight depression of the disk at the initiation of valve opening, pressurized fluid is allowed to by-pass upwardly about the inside of the gasket through the relief port aforesaid while said gasket is still in sealing engagement with the seat, before the disk is moved to full open position.

2. A valve according to claim 1, wherein a plurality of relief ports are disposed in uniformly spaced relation about the closure element.

3. In a valve of the character described having an outlet with a downwardly flaring annular seat at the top of its body, a closure disk adapted to cooperate with said seat and normally urged toward its closed position by spring means, said disk having a beveled periphery conformative with the flare of the seat; a square section circumferential groove whereof the top and bottom faces are coplanar with the disk, having at least one relief port in lateral communication with the groove and open at the top of the disk; and a resilient O ring gasket lodged in the groove of the disk, said gasket being less in thickness than the width of the groove and being normally compressed by the force of the spring means and upward pressure of the fluid between the bottom of the groove and the bevel of the outlet seat when the valve is closed whereby, upon downward movement of the disk at the initiation of valve opening, the gasket is temporarily held to the seat by upward pressure of fluid in the valve body with attendant bleeding of fluid upwardly through the relief port in the disk.

References Cited in the file of this patent

UNITED STATES PATENTS

| | | |
|---|---|---|
| 827,716 | Eastwood | Aug. 7, 1906 |
| 1,712,298 | Ford | May 7, 1929 |
| 1,716,896 | Miller | June 11, 1929 |
| 1,777,001 | Kellan | Sept. 30, 1930 |
| 2,355,408 | Wyss | Aug. 8, 1944 |
| 2,417,494 | Hoof | Mar. 18, 1947 |
| 2,713,989 | Bryant | July 26, 1955 |
| 2,737,980 | Taylor et al. | Mar. 13, 1956 |
| 2,751,927 | Kinney | June 26, 1956 |
| 2,753,884 | Lindray | July 10, 1956 |
| 2,765,806 | Webster | Oct. 9, 1956 |